United States Patent [19]

Klein

[11] 4,165,578
[45] Aug. 28, 1979

[54] BAITING HOOK WITH BARBED CONNECTOR

[76] Inventor: Gerald B. Klein, 13451 Stuart Ct., Broomfield, Colo. 80020

[21] Appl. No.: 764,026

[22] Filed: Jan. 31, 1977

[51] Int. Cl.² ............................................. A01K 83/06
[52] U.S. Cl. ...................................................... 43/44.8
[58] Field of Search .................. 43/42.37, 43.16, 44.2, 43/44.8, 44.81, 44.82, 44.83, 44.84, 44.86, 44.91, 44.92, 44.94

[56] References Cited

U.S. PATENT DOCUMENTS

| | | | |
|---|---|---|---|
| 70,913 | 11/1867 | Sterling | 43/44.8 |
| 3,624,950 | 12/1971 | Merckes | 43/44.2 |
| 3,760,526 | 9/1973 | Hicks | 43/44.8 |
| 3,988,852 | 11/1976 | Klein | 43/44.91 |

FOREIGN PATENT DOCUMENTS

| | | | |
|---|---|---|---|
| 1223538 | 6/1960 | France | 43/44.83 |
| 1433 | of 1884 | United Kingdom | 43/44.8 |

Primary Examiner—Louis G. Mancene
Assistant Examiner—Robert P. Swiatek
Attorney, Agent, or Firm—Dennis O. Kraft

[57] ABSTRACT

A hook with a connector therefor upon which bait can be threaded thereon and securely held in place is disclosed, the hook with a connector performing the well-known functions of a Carlisle or Peckway minnow hook in an improved manner, and without the necessity for tedious hand-wrapping of a snell to the shank of a hook. The novel hook with a connector comprises an elongated rod-like tubular connecting member of a resilient, synthetic resin material, such as nylon, and having a diameter which does not greatly exceed the diameter of a hook shank attached thereto to enable bait to be threaded thereon and passed onto and over the connector. The shank of a hook is disposed in an axial socket which extends into one end of the connecting member, the axial socket having a diameter slightly less than the diameter of the hook shank so as to resiliently and firmly grip same. The other end of the connecting member is adapted for connection to a fishing line and may have an integral snell formed thereat, or may alternatively have a passageway therein into which a line may be threaded. At least one spur or barb is integrally formed on the connecting member and extends therefrom in a direction outward, upward, and away from the hook shank. The spur, in addition to being adapted to penetrate and securely hold bait threaded thereover, further defines a directing means in the nature of a pivot point by which the point of the hook, upon the application of a pulling force to the shank thereof, will have a tendency to be directed into the tissue of a fish by pivoting against the fish about the spur.

5 Claims, 4 Drawing Figures

BAITING HOOK WITH BARBED CONNECTOR

BACKGROUND OF THE INVENTION

This invention generally relates to fishing implements and is particularly concerned with the provision of a hook with a connector therefor upon which a spur or barb is formed so as to provide an apparatus which functions in a manner similar to but greatly improved over the well-known Carlisle or Peckway minnow hooks.

Baiting hooks, such as the Carlisle or Peckway minnow hook, have long been utilized by fishermen, these hooks having the characteristic construction of a barb formed at an end of the hook opposite the hook point, which barb is adapted to restrain and hold bait, such as a worm or minnow which is threaded over the hook and penetrated by the barb. In this respect, initial attention is directed to FIG. 1 of the Application drawings in which a typical baiting hook, such as a Carlisle minnow hook is disclosed.

From this Figure, it will be seen that such a typical hook comprises a metal shank 10 having a barbed point 12 at one end thereof and a further metal barb or spur 14 at the other end, instead of being provided with an eye as is conventional with other forms of hooks and to which a line or snell is to be attached. With a Carlisle or baiting hook of the general type described, a snell or line 16 is attached to the shank 10 of the hook by a tedious hand-wrapping process by which multiple windings 18 of thread such as silk or nylon is wrapped to securely hold the snell to the shank.

The user of a baiting hook such as the Carlisle or Peckway hook threads bait such as a minnow or worm over the shank of the hook 10 and up towards the line or snell 16 in a fashion such that the barb or spur 14 penetrates the bait and, hopefully, holds the bait in place. In practice, this desired operation of conventional, available, and existing baiting hooks does not always hold true.

For example, hooks of this general type are utilized in baitcasting, spin, and fly fishing and, during casting of the line, the rigid metal barb 14 often times rips the bait to the point where the bait no longer is securely held and can come off the hook. Furthermore, a fish which attempts to take the bait but which is not securely hooked on the point 12 of the hook often times is hooked instead on the rigid spur 14, which spur, of course, is not designed to securely hold the fish and therefore results in a loss of the fish itself, even though the bait may have been taken.

Of course, and as already is apparent in the industry, the necessity of the tedious hand-wrapping of the snell 16 of the hook 10 itself constitutes a grave disadvantage to the continued utilization and manufacture of such baiting hooks. This basic disadvantage, coupled with the inferior and improper operation of the metal barb 14 constructed as an extension of the hook shank 10 per se as above-discussed provides the background against which the instant invention has been developed.

SUMMARY OF THE INVENTION

A need is urgently felt in the art for the development of a baiting hook which, while preserving the basic functions of the existing baiting hooks of the Carlisle-Peckway type, does so in a fashion by which the disadvantages of same are obviated. It is the primary objective of the instant invention to provide such a baiting hook which clearly satisfies this need.

A further objective of the instant invention is the provision of a baiting hook with a connector therefor which serves to entirely eliminate the necessity of a tedious hand-wrapping operation to secure a line or snell to the hook shank.

Yet another objective of the instant invention is directed to the provision of a baiting hook in which the spur or barb thereon is constructed of a resilient rather than a rigid material, whereby the shock of casting is absorbed and whereby the spur or barb does not deleteriously rip the bait.

Still another objective of the instant invention is the provision of a baiting hook with a connector therefor which has at least one spur or barb integrally formed therewith and which is constructed of a resilient but relatively solid and firm material, which spur avoids a "false" hooking of a fish and rather serves as a directing means in the nature of a pivot point by which the actual point of the hook, upon the application of a pull on the shank will have tendency to be directed firmly into the tissue of a fish, by pivoting against the fish about the spur.

These as well as other objectives of the instant invention which will be better appreciated as the description proceeds are implemented by the provision of a baiting-type hook with a connector therefor upon which bait can be threaded thereon and securely held in place, all as is constructed in accordance with the teachings of the instant invention. An elongated rod-like tubular connecting member of a resilient resin material, such as nylon, is provided and is molded in its preferred manufacturing method to have a diameter which does not greatly exceed the diameter of a hook shank attached thereto. An axial socket extends into one end of the connecting member and has a diameter which is slightly less than the diameter of the hook shank. A hook is provided with its shank extending into, and resiliently and firmly being gripped by the axial socket. The other end of the tubular connecting member is adapted for connection to a fishing line through a technique which does not require the laborious hand-wrapping of the thread.

Such technique of attachment to the line, in one embodiment, contemplates the provision of an elongated snell which is integrally formed thereon to which the line can thereafter be directly attached. In yet another embodiment of the invention, this end of the connecting member is itself provided with an axial passageway of a diameter slightly greater than the diameter of a fishing line, as well as a side opening which communicates with the axial passageway and which has a width at least as great as the diameter of the axial passageway but which does not exceed the diameter of a knotted end of a fishing line. With this particular inventive embodiment, the end of a line may be threaded into the axial passageway, extended from the communicating opening, knotted and then pulled back into the opening with the knotted end being forced into the opening with a slight stretching of the resilient connector about the knotted end, to thus effect a tight fit and a gripping of the knotted end of the line.

Importantly, at least one barb or spur is integrally formed on the connecting member and is constructed of the same material as such connecting member, this barb or spur extending therefrom in a direction outward, upward and away from the hook shank. The barb or spur, in a fashion similar to that of the well-known Carlisle or Peckway minnow hook, is adapted to penetrate and securely hold the bait threaded thereover. Yet, since the barb or spur is constructed of a resilient material, such as of the nylon of the connecting member, the material can absorb the shock of casting such that the bait held thereon is not adversely ripped. Furthermore, the resilience of the spur of the instant invention is such as to avoid a false hooking of the fish and rather, such resilient spur serves as a directing means in the nature of a pivot point by which, when a fish is not securely hooked, the point of the hook upon the application of a pull on the shank will have a tendency to be directed into the tissue of a fish by pivoting against the fish about the spur.

BRIEF DESCRIPTION OF THE DRAWINGS

The invention itself will be better understood and further features and advantages thereof will become apparent from the following description of a preferred inventive embodiment, such description making reference to the appended sheets of drawings, wherein.

DETAILED DESCRIPTION OF THE PREFERRED INVENTIVE EMBODIMENTS

Figure 2:
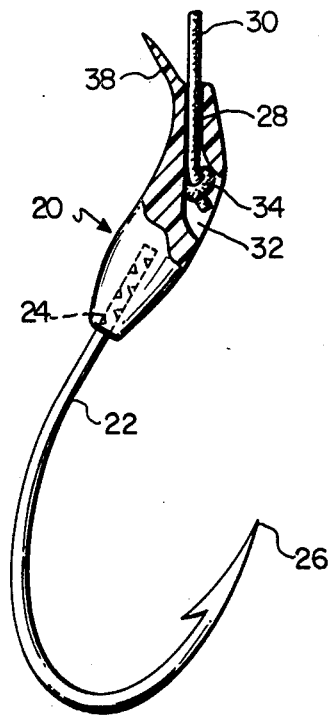
FIG. 2 is a perspective illustration, partly broken away for illustrative clarity, of one embodiment of the instant inventive baiting hook.

Particular reference is now directed to FIG. 2 of the Application drawings wherein a first and preferred embodiment of the instant invention is disclosed. The hook with a connector upon which bait can be threaded thereon and securely held in place in accordance with the inventive teachings will be seen to comprise an elongated rod-like tubular connecting member 20 of a resilient, synthetic resin material such as nylon, which connecting member has a diameter which does not greatly exceed the diameter of a hook shank 22 attached thereto as will be discussed hereinbelow.

An axial socket 24 extends into one end of the connecting member 20 and has a diameter slightly less than the diameter of the hook shank 22. Hook shank 22 extends into and is resiliently and firmly gripped by the axial socket 24, hook shank 22 terminating at its far end in a standard pointed barb 26, hook shank 22 being constructed in conventional fashion of a metal. If desired, and as illustrated, the end of hook shank 22 which extends into the axial passageway or socket 24 of the connecting member 20 can be serrated so as to increase the gripping action between the shank 22 and the connecting member 20.

The other end of the connecting member 20 is adapted for connection to a fishing line by way of several alternative techniques. In the embodiment shown in FIG. 2, a further axial passageway 28 is disposed in the other end of the connecting member 20, this passageway being slightly larger in cross-section than the diameter of a fishing line 30 so as to receive the same. A side opening 32 is provided in the tubular connecting member 20 and serves to communicate with the axial passageway 28. The width of the side opening 32 is at least as great as the diameter of passageway 28, but does not exceed the diameter of a knotted end 34 of the line 30. Thus, the side opening 32 will, in this instance, define a gripping means whereby the end of the line may be threaded into the first passageway, extended from the communicating side opening 32, knotted, and then pulled back into the side opening with the knotted end being forced into the opening with a slight stretching of the resilient connector about the knotted end to thus effect a tight fit and a gripping of the knotted end of the line. Therefore, and as is already described, the novel arrangement of the instant invention will be seen to have entirely eliminated the necessity of a laborious hand-wrapping of thread, such as thread 18 so long associated with prior-art constructions of the type shown in FIG. 1.

Figure 3:
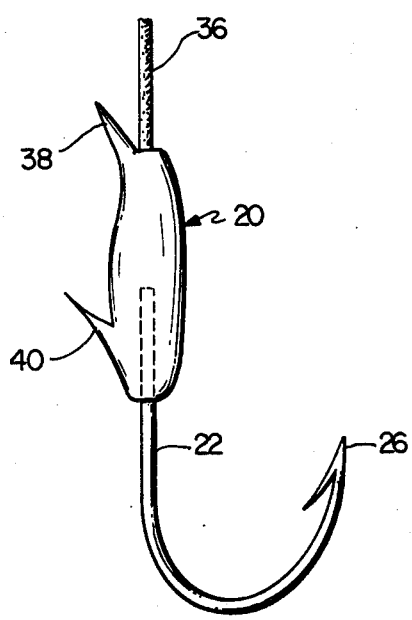
FIG. 3 is a perspective illustration of a further embodiment of the baiting hook of the instant invention.

As an alternative to the line attachment technique depicted in FIG. 2, a snell 36 as is depicted in FIG. 3, for example, may be integrally formed with the tubular connecting member 20, to which snell a line may be attached through an eyelet or the like such as illustrated in co-pending U.S. Pat. application Ser. No. 582,348 filed May 30, 1975, now U.S. Pat. No. 3,983,657.

Importantly, it is to be noted that the tubular connecting member 20 has at least one barb or spur 38 integrally formed thereon and extending therefrom in a direction outward, upward and away from the hook shank 22. In that the spur 38 is constructed of the same resilient material as is the tubular connector 20, such as of nylon in the preferred mode, a number of important advantages result as contrasted with the prior-art baiting hooks of the type already described with reference to FIG. 1. Specifically, and in a fashion similar to the Carlisle-type or Peckway-type baiting hook, bait, such as a minnow or worm is contemplated to be threaded on the hook shank 22 and over the connector 20 such that the barb or spur 38 penetrates the bait and securely holds same in place. The nylon material of which the connecting member 20 as well as the spur 38 is constructed has a sufficient rigidity or toughness such that a penetration of the much softer bait takes place.

Yet, due to the resilience of the nylon material as contrasted with the rigidity of the metal of the spurs or barbs of prior-art baiting hooks, when the hook of the instant invention is cast, the shock of the cast will be somewhat absorbed by the resilient spur 38, such that the spur 38 will not tear and rip the bait into which it penetrates in a deleterious fashion.

Additionally, the construction of the spur or barb 38 of the resilient material provides the very important advantage of eliminating a "false" hooking of a fish which does not squarely strike and take the hook.

Figure 1:
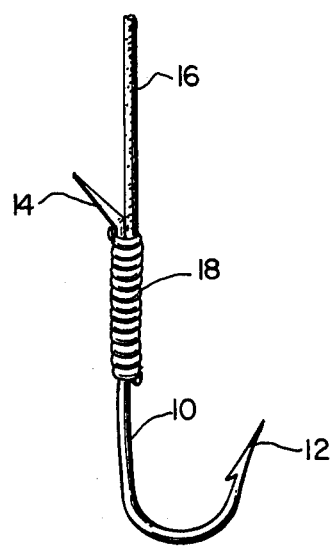
FIG. 1 is a perspective illustration of a prior-art baiting hook, such as a Carlisle minnow hook as has already been described in some detail.

In this respect, and as has been described with respect to the conventional construction of FIG. 1, the spur or barb 14, being a rigid extension of the metal hook shank 10 itself, very often serves to hook the fish but in a fashion which is by no means as efficient as a firm lodging in the tissues of the fish of the point 12 of the hook per se as is intended. The fish often times is lost due to this false hooking. With the instant invention, on the other hand, the resilience of the spur or barb 38 causes the spur to act in the fashion of a pivot point to guide and direct the actual point 26 of the hook towards the tissue of a fish to effect a firm hooking of the fish as opposed to a false hooking of same. Thus, when a fish strikes the resilient spur 38, rather than a firm penetration of same into the tissues of the fish taking place, the connector with the hook therein will serve to roll or pivot about the resilient spur 38 so that the point 26 of the hook is directed towards the fish so as to securely hook same. This is an advantage in operation which serves to greatly expand the basic function of the conventional baiting hook per se.

The hook with its connector as constructed in accordance with the teachings of the instant invention can be manufactured through well-known and conventional molding techniques and, in fact, the tubular connecting member 20 can actually be molded directly about the shank 22 of the hook. Further, and as is shown in the embodiment of FIG. 2, the fishing line 30 is angularly displaced from the direction of the shank 22 of the hook. This displacement, caused by the angulation of the connecting member 20, serves to better align the point 26 of the hook with the line 30. This alignment serves to increase the force by which the point 26 of the hook is directed into the tissues of a fish upon the application of a pull to the fishing line.

It is to be appreciated that the barb or spur pattern may be varied so as to suit the purpose at hand. In FIG. 2 of the Application drawings, but a single spur 38 has been shown, this single spur arrangement being, in concept, the equivalent approach of the instant invention to the prior-art Carlisle or Peckway type baiting hooks as shown in FIG. 1. In FIG. 3 of the Application drawings, a variation in the spur pattern is shown, this variation being useful with either form of the invention wherein the fishing line is attached by means of an axial passageway as shown in FIG. 2, or by means of an integral snell 36 as is shown in FIG. 3.

In FIG. 3, a first spur also indicated by reference number is shown in the same position as spur 38 of FIG. 2. However, at a second and removed location or point displaced along the length of the connecting member 20, a second spur or barb 40 is integrally formed.

Figure 4:
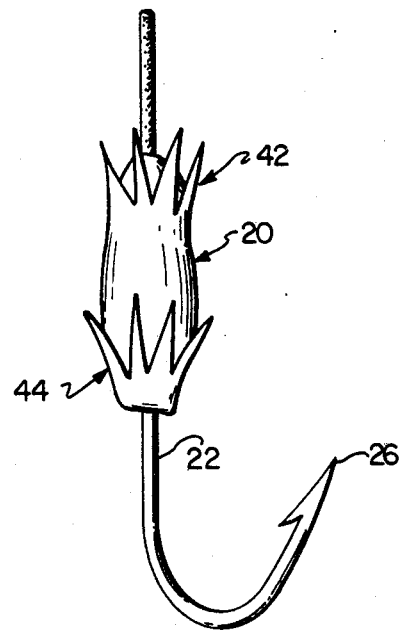
FIG. 4 is a perspective illustration of yet another embodiment of the baiting hook of the instant invention, depicting the utilization of a multiplicity of spurs or barbs much in the shape of a crown.

In FIG. 4 of the Application drawings, a far more complicated construction and arrangement of resilient though integrally formed spurs are shown. Specifically, in this exemplary construction, crowns or rosettes 42 and 44 of spurs are depicted as being formed about either one or both ends of the connecting member 20 as is illustrated.

Other modifications to the specific construction of the hook with a connector as shown will occur to those skilled in the art though still within the scope of the instant invention as is set forth in the appended claims. It should be appreciated that the objectives set forth at the outset of this specification have been successfully achieved.

What is claimed is:

1. A hook with a connector therefor upon which bait can be threaded thereon and securely held in place, comprising:
    an elongated rod-like tubular connecting member of a resilient synthetic resin material having a diameter which does not greatly exceed the diameter of a hook shank attached thereto;
    an axial socket extending into one end of said connecting member and having a diameter slightly less than the diameter of said hook shank with a hook having a shank extending into and resiliently and firmly gripped by said axial socket;
    the other end of said connecting member being adapted for connection to a fishing line; and
    at least one spur integrally formed on said connecting member and extending therefrom in a direction outward, upward and away from said hook shank, said spur being adapted to penetrate and securely hold bait threaded thereover and further defining directing means in the nature of a pivot point by which the point of said hook, upon the application of a pulling force on the shank, will have a tendency to be directed into the tissue of a fish by pivoting against the fish about said spur.

2. A hook with a connector as defined in claim 1, wherein a plurality of spurs are integrally formed on said connecting member at different points along the length thereof.

3. A hook with a connector as defined in claim 1, wherein said resilient, synthetic resin material is nylon.

4. A hook with a connector as defined in claim 1, wherein said other end of said connecting member adapted for connection to a fishing line has a further axial passageway extending therein from said other end and of a diameter slightly larger in cross-section than the diameter of a fishing line to receive same; an opening in the side of said connecting member communicating with said further axial passageway with the width of said opening being at least as great as the diameter of said further axial passageway but not exceeding the diameter of a knotted end of the fishing line, said communicating opening defining gripping means whereby the end of the line may be threaded into said further passageway, extended from the communicating opening, knotted, and then pulled back into the communicating opening with the knotted end being forced into the opening with a slight stretching of the resilient connecting member about the knotted end of the line to thus effect a tight fit and a gripping of the knotted end of the line.

5. A hook with a connector as defined in claim 1, wherein said other end of said connecting member adapted for connection to a fishing line has an elongated snell integrally formed therewith to which a line can be attached.

* * * * *